United States Patent Office 3,651,055
Patented Mar. 21, 1972

3,651,055
ANTHRAQUINONYL-TRIAZINE DYESTUFFS
Dennis Eckersley, Manchester, England, assignor to Imperial Chemical Industries Limited, London, England
No Drawing. Filed May 18, 1970, Ser. No. 38,542
Claims priority, application Great Britain, July 4, 1969, 33,872/69
Int. Cl. C07d 51/42, 55/46
U.S. Cl. 260—249                                   5 Claims

ABSTRACT OF THE DISCLOSURE

Anthraquinone dyes of the general formula:

A—T—Np—T—A where each A represents a 1-amino-2-sulphoanthraquinon-4-ylaminoaryl moiety, Np represents a sulphonated 1,5- or 2,6-naphthylene radical and each T represents a chloro-s-triazine or chloro-5-cyanopyrimidine radical linked to A or to Np by a bridging amino group, are valuable reactive dyes for cellulose textiles giving a range of bright reddish-blue to green shades of excellent fastness to washing and to light. The dyes are notable for the high proportion which reacts with the fibre when applied from alkali- and salt-containing dyebaths in the beck or on the jig or winch.

---

This invention relates to a novel class of valuable anthraquinone dyestuffs useful as reactive dyestuffs, especially for the colouration of cellulose textile materials.

A number of anthraquinone reactive dyestuffs of the monochloro-s-triazine series are commercially available and recommended for the dyeing and printing of cellulose textiles in conjunction with an acid-binding agent. These dyestuffs are primarily distinguished by their low substantivity and excellent solubility which renders them eminently suitable for printing or for dyeing by continuous methods involving a padding technique for application of the dyestuff to the fibre. However, application of these dyestuffs on the jig or winch or in the beck by the exhaust method gives poor colour yield owing to the properties of low substantivity and high water-solubility which favour their use in the other methods of application. A need accordingly exists for anthraquinone dyestuffs which exhaust well on to the fibre and which have good washing-off properties for removal of unfixed dyestuff.

The present invention provides a class of novel dyestuffs having this combination of properties, namely those represented by the general formula:

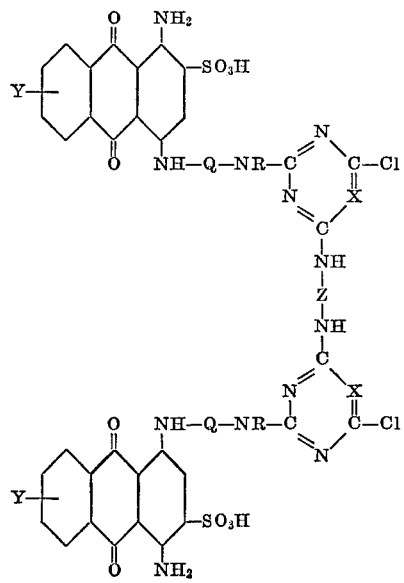

in which:
Y represents H or $SO_3H$,
Q represents a mono- or di-cyclic radical of the benzene series which may carry substituents on the benzene nucleus or nuclei,
R represents H or an alkyl group having up to 4 carbon atoms,
X represents N or C—CN, and
Z represents 1,5 - naphthylene or 2,6 - naphthylene in which the naphthylene nucleus carries at least one $SO_3H$ group.

As examples of radicals represented by Q, there may be mentioned m and p-phenylene, 4,4'-stilbene, 4,4'-diphenylene, 4,4'-diphenylsulphone and 4,4'-azobenzene. In general it is preferred that these benzene nuclei should each carry a sulphonic acid group; in the case of phenylene itself, other substituents may be present, e.g. methyl, ethyl, chlorine, bromine or methoxy. A preferred class of dyestuffs are those in which Q represents a radical of the formula:

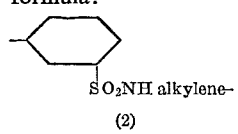  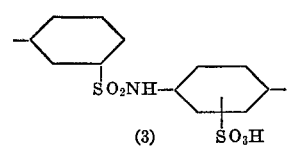

(2)                                      (3)

or

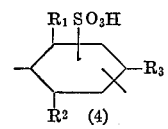

(4)

in which $R_1$, $R_2$ and $R_3$ represent $CH_3$, $C_2H_5$, Cl or Br, since these dyestuffs give exceptionally bright reddish-blue shades.

As examples of radicals represented by Z, there may be mentioned 2 - sulpho-1,5-naphthylene, 4-sulpho-1,5-naphthylene and 4-sulpho-2,6-naphthylene but more especially, 3,7-disulpho-1,5-naphthylene and above all 4,8-disulpho-2,6-naphthylene.

The invention also provides a process for manufacture of the dyes of the Formula 1 which comprises reacting together either cyanuric chloride or 5-cyano-2,4,6-trichloropyrimidine with an equimolecular proportion of an amino-anthraquinone compound of the formula:

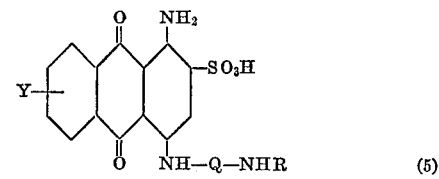

(5)

wherein the symbols Q, R and Y have the meanings stated above, and with one-half of one molecular proportion of a naphthylene diamine of the formula:

$$NH_2\text{-}Z\text{-}NH_2 \qquad (6)$$

The above process may conveniently be effected in aqueous medium, and is preferably carried out in two stages, contacting the cyanuric chloride or 5-cyano-2,4,6-trichloropyrimidine with either of the other two reactants at a temperature within the range 0–5° C. until reaction is substantially complete to form a compound of the formula:

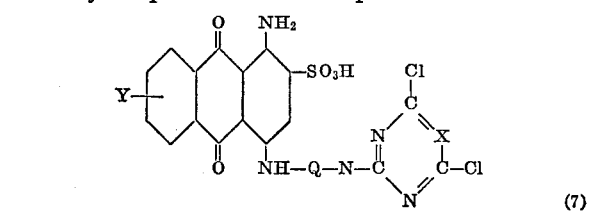

(7)

or

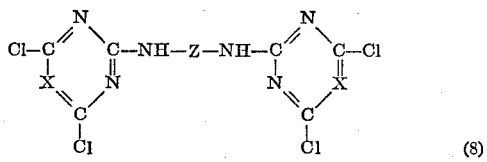

(8)

as the case may be, and then adding the third reactant and continuing reaction at a temperature within the range 30–60° C. The reactions are preferably carried out in the presence of an acid-binding agent, e.g. an alkali metal bicarbonate, carbonate or hydroxide, added at such a rate as will neutralise the hydrochloric acid liberated during the reaction and maintain the pH of the mixture within the range 6–8.

As examples of amino-anthraquinone compounds of Formula 5 which may be used, there may be mentioned:

1-amino-4(4'-aminoanilino)anthraquinone-2,3'-disulphonic acid,
1-amino-4(4'-methylaminoanilino)anthraquinone-2,3'-disulphonic acid,
1-amino-4(4'-aminoanilino)anthraquinone-2,3',5-trisulphonic acid,
1-amino-4[3'-N(β-aminoethyl)sulphamylanilino] anthraquinone-2-sulphonic acid,
1-amino-4[3'-N(4''-aminophenyl)sulphamylanilino] anthraquinone-2,3'' disulphonic acid,
1-amino-4(3'-amino-2',4',6'-trimethylanilino) anthraquinone-2,5' disulphonic acid,
1-amino-4(4'-amino-2',6'-dimethyl or diethylanilino) anthraquinone-2,5' disulphonic acid,
1-amino-4(4'-amino-2'-methyl-6'-bromoanilino) anthraquinone-2 sulphonic acid,
1-amino-4(4'-aminodiphenyl)aminoanthraquinone 2,3'' disulphonic acid, and
1-amino-4[4'-ω(4''-aminostyryl)anilino]anthraquinone 2,2'',3' trisulphonic acid.

As examples of naphthylene diamines of Formula 6 which may be used, there may be mentioned:

2,6 diaminonaphthalene-4,8 disulphonic acid,
1,5 diaminonaphthalene-3,7 disulphonic acid,
2,6 diaminonaphthalene-4 sulphonic acid,
1,5 diaminonaphthalene-2 sulphonic acid, and
1,5 diaminonaphthalene-4 sulphonic acid.

The new anthraquinone dyestuffs may be isolated from the medium in which they have been formed by the usual techniques adopted for isolation of water-soluble reactive dyestuffs, e.g. by spray-drying the reaction mixture or by salting out followed by filtration. If desired, stabilisers, e.g. alkali metal hydrogen phosphates, and diluents, e.g. sodium chloride or urea, may be added to obtain a powder of standard dyestuff content.

The new water-soluble dyestuffs are valuable for colouring cellulose textile materials, for example, textile materials comprising natural or regenerated cotton. For colouring such textile materials, the new dyestuffs are preferably applied, either by a dyeing or printing process, to the cellulose textile materials in conjunction with a treatment with an acid-binding agent, for example sodium hydroxide, sodium carbonate or sodium bicarbonate which may be applied to the cellulose textile material before, during or after the application of dyestuffs. Alternatively when the colouration process involves the use of a heating step a substance can be used, for example sodium trichloroacetate, which is changed into an acid-bonding agent during the heating step. When so applied to cellulose textile materials the new dyestuffs react with the cellulose and provide a wide variety of shades having very good fastness to light and to wet treatments especially to severe washing. They are notable for the high proportion which reacts when applied from saline dyebaths in the beck, or on the jig or winch.

The invention is illustrated but not limited by the following examples in which parts and percentages are by weight:

EXAMPLE 1

A solution of 11.5 parts of the disodium salt of 1-amino-4-(2',4',6'-trimethyl-3'-amino anilino)anthraquinone-2,5'-disulphonic acid in 150 parts of water, is added during 15 minutes to a stirred suspension of 3.9 parts of cyanuric chloride in 30 parts of acetone and 100 parts of water at 0–5° C. The pH of the reaction mixture is maintained throughout the addition at 4–5 by the gradual addition of 2 N sodium carbonate solution. The reaction mixture is stirred at 0–5° C. and pH 4–5 for a further 30 minutes and filtered to remove traces of insoluble material. The filtrates are stirred at pH 6–7 and a solution of 3.6 parts of the disodium salt of 2,6-diaminonaphthalene-4,8-disulphonic acid in 50 parts of water is added at 35° C. during 20 minutes. The reaction mixture is stirred at 40–45° C. for 15 minutes, then at 50–55° C. for 90 minutes whilst the pH is maintained at 6–7. 60 parts of sodium chloride are added and the mixture is stirred and cooled for 1 hour. The precipitated dyestuff is filtered, washed on the filter with a solution of 30 parts of sodium chloride in 200 parts of water and is finally dried in vacuo at 35–40° C.

The resultant dyestuff on analysis is found to contain 2.0 atoms of hydrolysable Cl per molecule of dyestuff and when applied to cellulosic fibres in conjunction with acid-binding agent by hot exhaustion dyeing techniques yields strong bright-reddish blue tints of excellent fastness to wet treatments.

EXAMPLE 2

A solution of 12.3 parts of the trisodium salt of 1-amino-4(4'-aminoanilino)anthraquinone - 2,3',5-trisulphonic acid in 300 parts of water, is added during 15 minutes to a stirred suspension of 4.0 parts of cyanuric chloride in 35 parts of acetone and 100 parts of water at 0–50° C. The pH of the reaction mixture is maintained throughout the addition at 4–5 by the gradual addition of 2 N sodium carbonate solution. The reaction mixture is stirred at pH 4–5 and 0–5° C. For a further 20 minutes and filtered to remove traces of insoluble material. The filtrates are stirred at pH 6–7 and a solution of 3.6 parts of the disodium salt of 2,6-diaminonaphthalene-4,8-disulphonic acid in 50 parts of water is added at 35° C. during 15 minutes. The reaction mixture is stirred at 35° C. for 1 hour then at 45–50° C. for 2 hours whilst the pH is maintained at 6–7 by the gradual addition of 2 N sodium carbonate solution. 75 parts of sodium chloride are added and the mixture is allowed to stir and cool for 1 hour. The precipitated dyestuff is filtered, washed in the filter with a solution of 30 parts of sodium chloride in 200 parts of water and is finally dried in vacuo at 35–40° C. The resultant dyestuff on analysis is found to contain 2.0 atoms of hydrolysable Cl per molecule of dyestuff and when applied to cellulosic fibres in conjunction with acid-binding agents by hot exhaustion dyeing techniques yields strong greenish-blue tints of excellent fastness to wet treatments.

By substitution in the above example of 10.7 parts of the disodium salt of 1-amino-4(4'-aminoanilino)-anthraquinone-2,3' disulphonic acid for the 12.3 parts of the trisodium salt of 1-amino-4(4'-aminoanilino)anthraquinone-2,3',5 trisulphonic acid, a mid-blue dyestuff of similar properties is obtained.

By condensation of the compounds listed in Column II with the acylating agents listed in Column III and condensation of the products with the diamino naphthalenes listed in Column IV in the manner and proportions described in Examples 1 and 2, dyes of similar properties are obtained. Column V lists the shades obtained when the resultant dyestuffs are applied to cellulosic materials.

| Example No. | Column II Aminoanthraquinone compounds | Column III Acylating agents | Column IV Naphthalene diamines | Column V |
|---|---|---|---|---|
| 3 | 1-amino-4(4'aminoanilino)anthraquinone-2,3'-disulphonic acid. | 5-cyano-2,4,6-trichloropyrimidine. | 1,5-diaminonaphthalene-3,7-disulphonic acid. | Mid-blue. |
| 4 | 1-amino-4(4'methylaminoanilino)anthraquinone-2,3'-disulphonic acid. | Cyanuric chloride | 2,6 diaminonaphthalene-4,8-disulphonic acid. | Reddish-blue. |
| 5 | 1-amino-4[3'-N(β-aminoethyl)sulphamylanilino]-anthraquinone-2-sulphonic acid. | ____do____ | ____do____ | Do. |
| 6 | 1-amino-4[3'-N(4''aminophenyl)sulphonylanilino]-anthraquinone-2,3'-disulphonic acid. | 5-cyano-2,4,6-trichloropyrimidine. | 1,5-diaminonaphthalene-3,7-disulphonic acid. | Do. |
| 7 | 1-amino-4(4''aminodiphenyl)aminoanthraquinone-2,3'-disulphonic acid. | Cyanuric chloride | 2,6-diaminonaphthalene-4-sulphonic acid. | Greenish-blue. |
| 8 | 1-amino-4(4'aminoanilino)anthraquinone-2,2'-disulphonic acid. | ____do____ | 1,5-diaminonaphthalene-4-sulphonic acid. | Mid-blue. |
| 9 | 1-amino-4-(2',4',6'-trimethyl-3'-aminoanilino)anthraquinone-2,5,5'-trisulphonic acid. | ____do____ | 2,6-diaminonaphthalene-4-sulphonic acid. | Reddish-blue. |
| 10 | 1-amino-4-(2',4'-dimethyl-4-aminoanilino)-anthraquinone-2,6'-disulphonic acid. | ____do____ | 2,6-diaminonaphthalene-4,8-disulphonic acid. | Do. |
| 11 | 1-amino-4(2'-bromo-4'-methylaminoanilino)-anthraquinone-2,6'-disulphonic acid. | ____do____ | 1,5-diaminonaphthalene-3,7-disulphonic acid. | Do. |
| 12 | 1-amino-4(2',6'-diethyl-3'-amino-4'-methyl-anilino-anthraquinone-2,5-disulphonic acid. | ____do____ | 2,6-diaminonaphthalene-4-sulphonic acid. | Do. |
| 13 | 1-amino-4-(3'-amino-4'-methoxyanilino)anthraquinone-2,5-disulphonic acid. | 5-cyano-2,4,6-trichloropyrimidine. | 2,6-diaminonaphthalene-4,8-disulphonic acid. | Mid-blue. |
| 14 | 1-amino-4[2',4',6'-trimethyl-3'-N(4''-aminophenyl)sulphamylanilino]-anthraquinone-2,3'-disulphonic acid. | Cyanuric chloride | 1,5-diaminonaphthalene-4-sulphonic acid. | Reddish-blue. |
| 15 | 1-amino-4-[4'-ω(4''-aminostyryl)anilino]-anthraquinone-2,2',3'-trisulphonic acid. | ____do____ | 2,6-diaminonaphthalene-4,8-disulphonic acid. | Bluish-green. |
| 16 | 1-amino-4(4''-aminodiphenylamino)-anthraquinone-2,2'',3'-trisulphonic acid. | 5-cyano-2,4,6-trichloropyrimidine. | 2,6-diaminonaphthalene-4,8-disulphonic acid. | Mid-blue. |
| 17 | 1-amino-4[4'-(4''-aminophenylazo)-anilino]-anthraquinone-2,2'',5-trisulphonic acid. | Cyanuric chloride | 2,6-diaminonaphthalene-4,8-disulphonic acid. | Green. |

What we claim is:
1. A dyestuff of the formula:

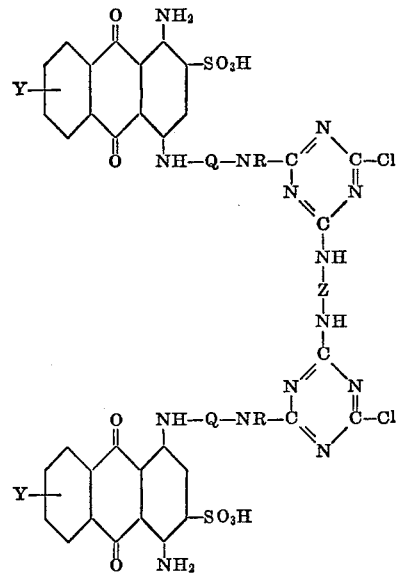

in which

Y represents H or SO₃H,

Q represents a radical of the formula:

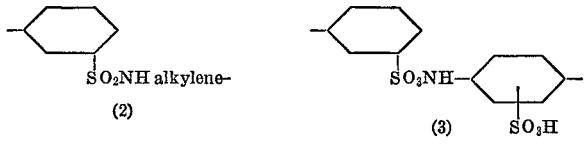

or

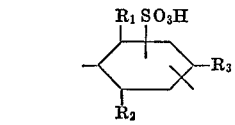

in which
$R_1$, $R_2$ and $R_3$ represent H, $CH_3$, $C_2H_5$, Cl or Br;
R represents H or an alkyl group having up to 4 carbon atoms, and
Z represents 1,5-naphthylene or 2,6-naphthylene in which the naphthylene nucleus carries from 1 to 2 $SO_3H$ groups as the sole substituent or substituents thereon.

2. A dyestuff as claimed in claim 1 wherein Z represents the 4,8-disulpho-2,6-naphthylene radical.

3. A dyestuff as claimed in claim 1 and represented by the formula

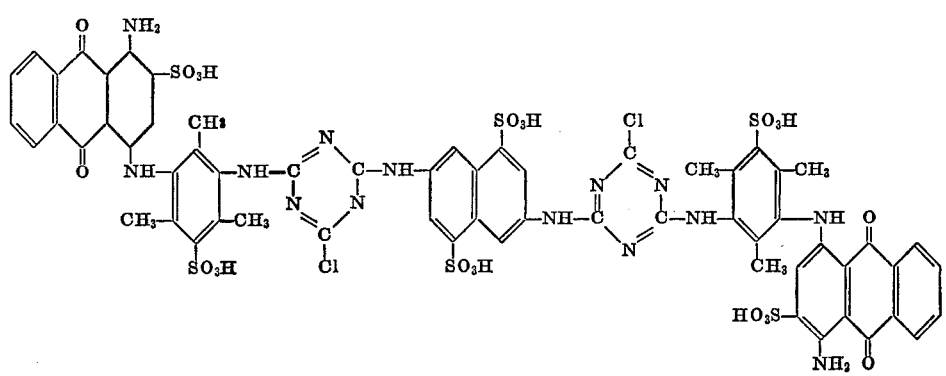

4. A dyestuff as claimed in claim 1 and represented by the formula:
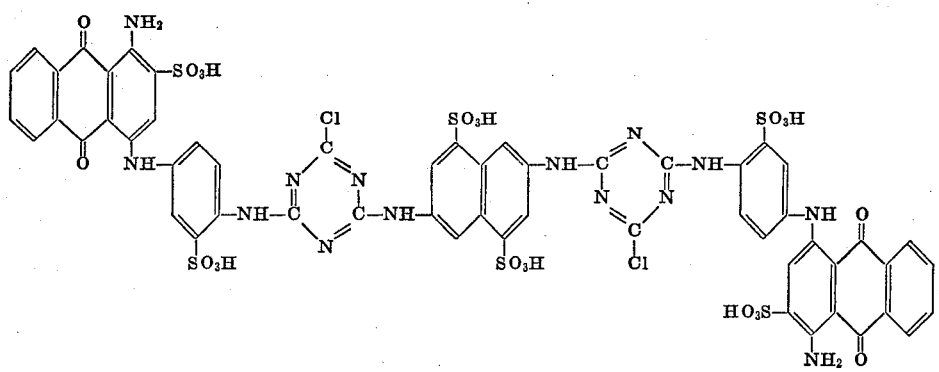
5. A dyestuff as claimed in claim 1 and represented by the formula:
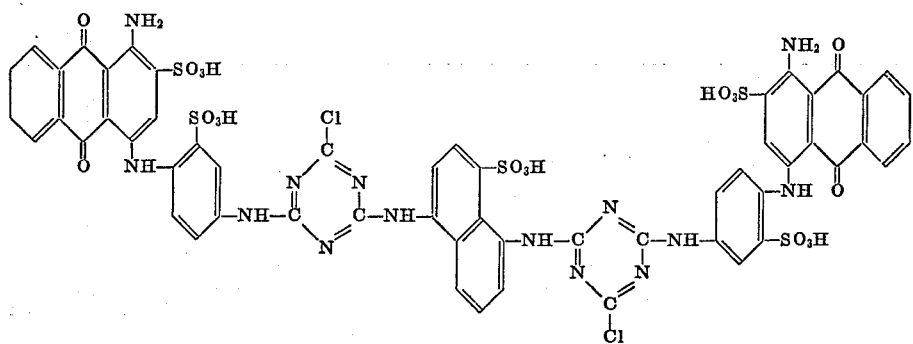
References Cited
UNITED STATES PATENTS
3,532,690  10/1970  Eckersley et al. ____ 260—249 X
JOHN M. FORD, Primary Examiner
U.S. Cl. X.R.
8—39, 54.2; 260—256.5 R